United States Patent
Dore et al.

(10) Patent No.: US 6,816,477 B1
(45) Date of Patent: Nov. 9, 2004

(54) TRANSMISSION METHOD IN A DOMESTIC COMMUNICATION SYSTEM COMPRISING A WIRELESS CHANNEL

(75) Inventors: Renaud Dore, Rennes (FR); Vincent Demoulin, Pleumeleuc (FR); Patrick Lopez, Livré s/Changeon (FR); Gilles Straub, Acigne (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/673,701
(22) PCT Filed: Apr. 21, 1999
(86) PCT No.: PCT/FR99/00945
  § 371 (c)(1),
  (2), (4) Date: Jan. 5, 2001
(87) PCT Pub. No.: WO99/55021
  PCT Pub. Date: Oct. 28, 1999

(30) Foreign Application Priority Data

Apr. 21, 1998 (FR) ............................................. 98 04983

(51) Int. Cl.$^7$ .............................................. H04B 7/212
(52) U.S. Cl. ...................................................... 370/347
(58) Field of Search ........................ 370/347, 389–395, 370/474, 329, 401–418; 395/337–340; 443/332; 448/458–462; 441/328; 280/310; 310/474; 455/522, 69, 450, 32

(56) References Cited

U.S. PATENT DOCUMENTS

| 5,420,851 A | * | 5/1995 | Seshadri et al. | ............ 370/280 |
|---|---|---|---|---|
| 5,602,836 A | * | 2/1997 | Papadopoulos et al. | ..... 370/280 |
| 5,619,504 A | * | 4/1997 | Van Grinsven et al. | ..... 370/347 |
| 5,648,958 A | * | 7/1997 | Counterman | ................. 370/458 |
| 5,684,791 A | * | 11/1997 | Raychaudhuri et al. | .. 370/310.2 |
| 6,088,337 A | * | 7/2000 | Eastmond et al. | ........... 370/280 |
| 6,452,924 B1 | * | 9/2002 | Golden et al. | ............... 370/352 |

FOREIGN PATENT DOCUMENTS

EP  0681406  11/1995  ............ H04Q/7/24

OTHER PUBLICATIONS

Dunlop J., "A Reservation Based Access Mechanism for 3$^{RD}$ Generation Celular Systems", Electronics and Communication Engineering Journal, vol. 5, No. 3, Jun. 1, 1993, pp. 180–186.

* cited by examiner

*Primary Examiner*—Chi Pham
*Assistant Examiner*—Prenell Jones
(74) *Attorney, Agent, or Firm*—Joseph S. Tripoli; Joseph J. Leks; Paul P. Kiel

(57) ABSTRACT

A method of transmission in a transmission network comprising devices connected to the network, at least certain devices being linked by at least one wireless link. According to the present method, the wireless communications are performed according to an isochronous TDMA type protocol, in which a frame is divided into time windows allocated on reservation to devices, the allocation of a window of a frame to a device being such that any device can deduce it from the number of windows reserved per frame by each device and from at least one other parameter which identifies the device which made the request. The invention applies in particular to domestic wireless communication networks.

10 Claims, 3 Drawing Sheets

Power level received by device 2

Power level received by device 5

Figure 1:
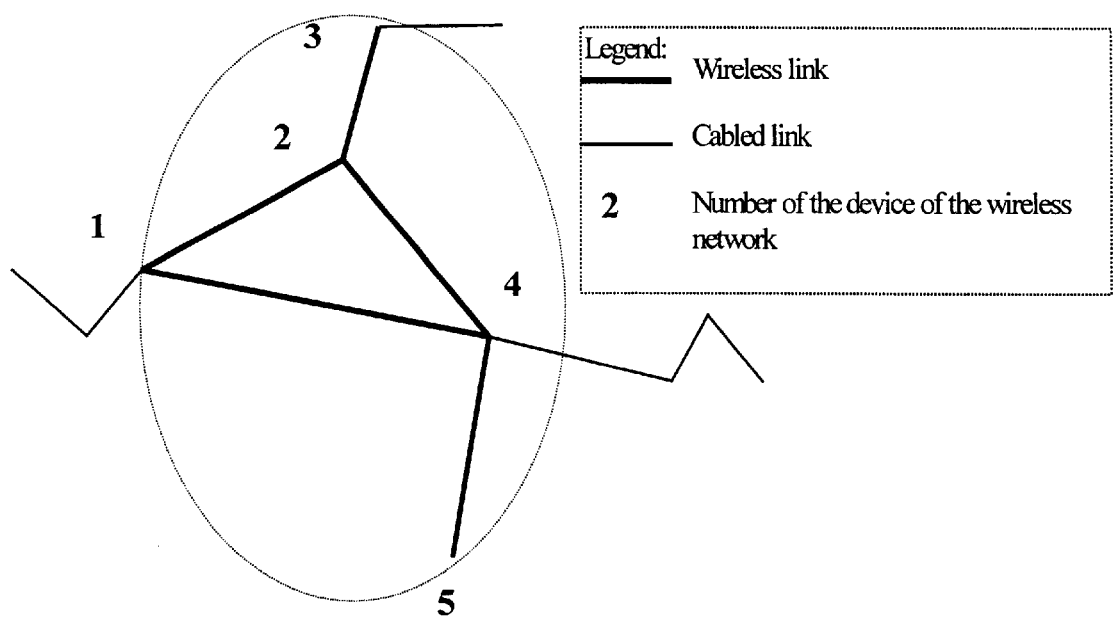

TRANSMISSION METHOD IN A DOMESTIC COMMUNICATION SYSTEM COMPRISING A WIRELESS CHANNEL

The subject of the invention is a process of transmission in a communication network in which at least certain connections are of "wireless" type. The invention applies in particular in the field of domestic communication networks.

In a domestic communication network, several types of multimedia equipment can coexist. Some of these equipment items may be linked together by way of cables. They then constitute a cabled group. A domestic communication network can comprise several cabled groups. A domestic communication network comprising several cabled groups can also comprise wireless links. These wireless links are intended to link the cabled groups to one another. The number of wireless links must be sufficient for each cabled group to be linked to at least one other cabled group.

The communication by wireless link can be effected simply via a link between two items of equipment in so-called "point-to-point" mode. However, more generally, there may be several simultaneous point-to-point links in the same domestic network. More generally still, these wireless links may together constitute what is referred to as a bridge in network terminology, that is to say a set of "multipoint-multipoint" links allowing the interconnecting of cabled buses of the IEEE1394–1995 type.

The set of wireless links constitutes the domestic wireless communication network. The cabled groups of the domestic communication network constitute the elements of the domestic wireless communication network.

For reasons of propagation in a domestic environment, it is possible that certain wireless links between various elements of the domestic wireless communication network may not be established. Consequently, within the domestic wireless communication network, it may happen that certain elements are not linked to all the others. Such a network is said to have incomplete connectivity.

The available passband is a limited resource and must be used in the most effective manner possible. The expression effective use of frequency is understood to mean any frequency allocation scheme which minimizes in particular the transmission of service data, such as for example data serving for the coordination of the members (devices) of the network.

The purpose of the invention is to propose an effective wireless channel access process.

The subject of the invention is a process of transmission in a transmission network comprising devices connected to the network, at least certain devices being linked by at least one wireless link, characterized in that:

the wireless communications are performed according to an isochronous TDMA type protocol, in which a frame is divided into time windows allocated on reservation to devices, the allocation of a window of a frame to a device being such that any device can deduce it from the number of windows reserved per frame by each device and from at least one other parameter which identifies the device which made the request.

The allocating of the windows of a frame is performed according to a nonequivocal method known by each device of the network, which may thus ascertain this allocation with the aid of a minimum of parameters.

According to a particular embodiment, each frame comprises one control window per device linked to the wireless part of the network, the position and order of the control windows within each frame being known by all the devices of this Wireless part of the network.

According to a particular embodiment, the control windows are distributed within the frame and the positions of these windows are identical at each frame.

According to a particular embodiment, the position of the control windows within a frame is determined subsequent to a reinitialization of the network, for example subsequent to the connecting or to the disconnecting of a device of the network.

A change of topology induces a modification of the allocation of the windows within a frame. This item of information must consequently also be broadcast.

According to a particular embodiment, when registering a device in the network, an order number is allocated to it, the order of the control windows being deduced from the order of the numbers allocated to the devices of the network. In the embodiment of the invention, this number is the "physical address" of a device.

According to a particular embodiment, the control window of a device comprises as appropriate a windows reservation data packet.

According to a particular embodiment, a device receiving a data packet relating to a reservation includes it in its next control window.

The reservation information is thus propagated gradually to all the devices of the network.

According to a particular embodiment, on each change of topology of the network, each device transmits a signalling of echo type in its control window, the said signalling intended to be broadcast in the network and to be returned by each of the other devices, the device which sent the signalling determining on the basis of the returns of signalling by the other devices the duration of broadcasting of its request for reservation in the network.

The expression change of topology of the network is understood to mean the connecting or the disconnecting of a device connected to the wireless part of the network. By virtue of the above method, a device is aware of the time required for one of its frames to reach all the devices of the network.

According to a particular embodiment, a device having sent a windows reservation request implements this reservation only after a duration corresponding to the duration of broadcasting of its control data in the network.

According to a particular embodiment, a frame furthermore comprises a time interval whose use is governed by a contentious process reserved for asynchronous transmission.

Figure 2A:
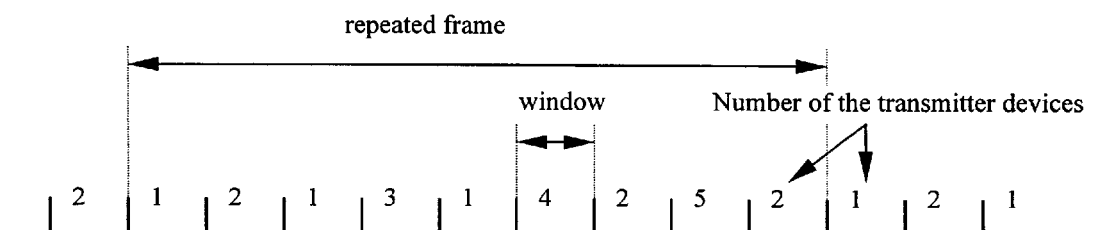
Figure 2B:
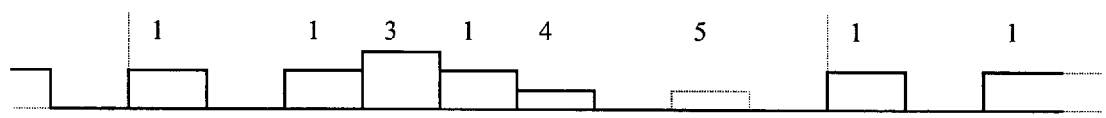
Figure 2C:
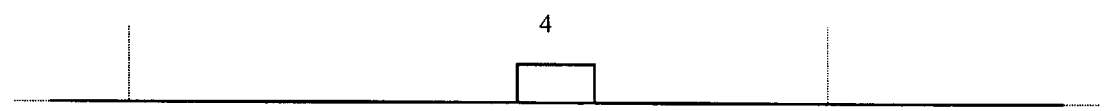
Figure 3:
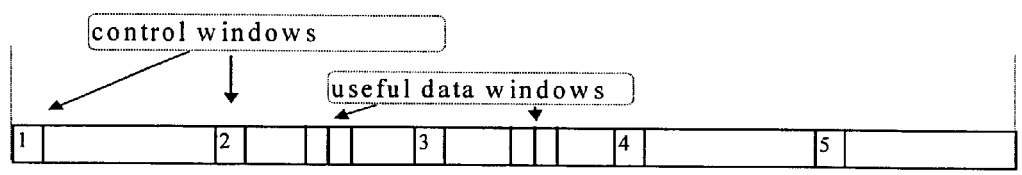
Figure 4:
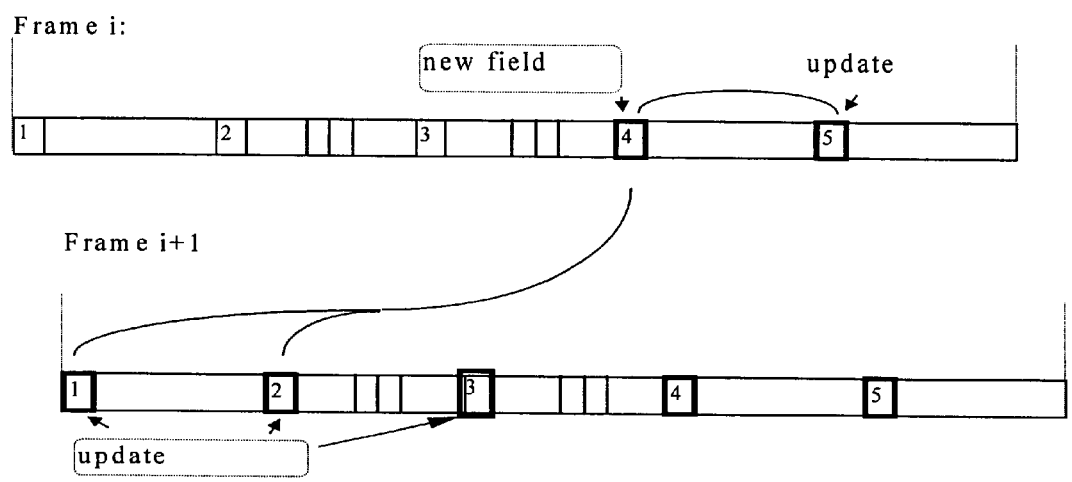

Other characteristics and advantages of the invention will become apparent through the description of a nonlimiting exemplary embodiment illustrated by the figures among which:

FIG. 1 diagrammatically represents an example of a communication network in which the process in accordance with the present example is implemented, FIG. 2a is a chart illustrating an exemplary distribution of windows within a TDMA frame, FIG. 2b is a chart representing the power level received by a first device of FIG. 1 for each window of the frame of FIG. 2a, FIG. 2c is a chart representing the power level received by a second device of FIG. 1 for each window of the frame of FIG. 2a, FIG. 3 diagrammatically represents the distribution of windows comprising service data and windows comprising useful data within a frame, FIG 4 diagrammatically represents several successive frames illustrating the propagation of an update of the allocation of the windows within the network of FIG. 1.

In a domestic wireless communication network whose elements comprise domestic multimedia equipment such as digital television decoders, video monitors, DVD or DVC recorders, audio systems, computers, printers or access to the switched telephone network, the magnitude of the bit rate to be transmitted is determined by the DV format (IEC 1083) and may reach 40 Mbit/s. Moreover, in such a network, it is difficult to allocate the role of master to a particular element, that is to say no element possesses a predominant function which can justify the allocating of this role. A master element is an element which possesses a decision capability which it can apply to all the other elements of the network.

The envisaged domestic wireless communication network is therefore a network constructed according to a distributed type architecture, that is to say one without a master element.

A first mechanism known per se which one might have considered for managing device access to the channel is the so-called "FDMA" mechanism (standing for "Frequency Division Multiple Access". This mechanism amounts to splitting the band into as many subbands as there are possible links. However, in a domestic network, the power received by a device of the network varies according to the transmitter device, given that the location of the devices is random in the rooms of the dwelling. The distances between devices are therefore variable, as is the attenuation of the signals which is introduced by obstacles such as walls or furniture. Also, in a network using the FDMA mechanism, each subband could be received by one and the same device with such disparate levels that the extraction of a subband by filtering becomes impossible, unless the spacing between subbands is increased and the overall passband is decreased.

A second mechanism consists in sharing the channel by using an orthogonal spreading code—the so-called "CDMA" mechanism (standing for "Code Division Multiple Access"). The contemplated useful bit rates of the order of 40 Mbits would require a spreading band with a frequency of greater than 100 MHz, this being incompatible with the current state of the art.

The mechanism implemented by the invention is the time-sharing mechanism—or "TDMA" standing for Time Division Multiple Access—where each device takes possession of the total passband for a time interval referred to as a "window". Access to the channel, that is to say who speaks next, is then determined by a frame to which all the members of the network are synchronized. This TDMA mechanism is flexible in that the bit rate of each link is determined by the proportion of windows which is allotted to it. The larger the number of windows per frame, the more finely it is possible to define the bit rate of each link. In practice, the TDMA frame is chopped into useful data windows and control windows for each device of the network. The control windows convey among other things the information required to determine the allocation of the windows to each device of the wireless network, that is to say the identity of the sending sources for each window.

In the domestic network, various links may coexist simultaneously between the devices. The bit rate assigned to each link may be variable: this link between a video recorder and a monitor can occupy 8 Mbit/s whilst that link between the digital decoder and a personal computer may occupy 1 Mbit/s. The configuration of the links can change as and when they are established and interrupted. Certain links possess a constant maximum bit rate known in advance (in particular when they transport an audio video stream), others have a variable and unpredictable bit rate (for example in the case of file transfer). It follows that the scheme for allotting windows is liable to change for each frame.

The quality of the radio link between any two devices of the network may be highly variable. This quality may be such that a given link may have to be regarded as nonexistent. Moreover, a link between any device of the network and any other device of this network is not necessarily justified. Within a given context, there may not be sufficient reason to connect two monitors as to justify the creation of a link. Given the potential existence of defective links between at least certain devices, even the devices which cannot communicate must coordinate with one another in order to access the wireless channel, that is to say they must be synchronized to the same TDMA frame. One is therefore confronted with the problem consisting in broadcasting one and the same TDMA frame—that is to say its structure and its position—over a network having incomplete connectivity.

FIG. 1 illustrates a network according to the present exemplary embodiment in which these problems may exist: five devices, numbered from 1 to 5, are linked by wireless transmission as follows (Table 1):

TABLE 1

| Devices | Wireless link |
|---------|---------------|
| 1 | 2–4 |
| 2 | 1–3–4 |
| 3 | 2 |
| 4 | 1–2–5 |
| 5 | 4 |

Cable links (fine lines) exist between the devices 1, 2 and 4 and other devices which are not illustrated. It will be noted by way of example that no wireless link is possible between devices 1 and 5.

FIG. 2a illustrates a distribution of the windows of a frame (which comprises nine windows) in the case of the network of FIG. 1. FIG. 2b illustrates the power received in each window, seen from device 2. The power received from device 5 (shown dotted) is too low for it to be possible to utilize the signal. FIG. 2c illustrates the power received by the device 5: the latter can receive only the transmissions from device 4.

The majority, if not all, the links in a domestic TDMA network are considered to be bidirectional. In the present example, each device of the network will be considered to use the same radio frequency band. Owing to the nature of these links, each device is sometimes transmitting and sometimes receiving (so-called "half-duplex" operation). When it is not transmitting, an device must listen successively to various other speakers. To do this it cannot employ the conventional techniques of synchronizing to a time-continuous signal with the aid of feedback control but must synchronize itself rapidly on the fly to any packet received at the start of each window. This packet synchronization is all the more difficult since on the one hand the passband of the signal received is large, thus leaving no room for sophisticated implementations of synchronization, and on the other hand since the source transmitting the packet is liable to change at each window. This quasi-instantaneous synchronization must on each occasion be matched to different power levels, carrier frequency disparities and temporal positioning disparities.

It may be necessary to have to transmit a system clock from one device of the network to all the other devices of the network. For example, a wireless network interconnecting IEEE1394 type cabled networks, that is to say an IEEE1394 wireless bridge, must transmit an 8 KHz clock from a device connected to the IEEE1394 node referred to as the "net cycle master". The features of the transmission of this clock within the framework of cabled networks interconnected by wireless links form the subject of a French Patent Application filed in the name of the Applicant on the same day as the present application and bearing the number 98 04982.

In order to relax these drastic constraints concerning synchronization, the static nature of the topology of the network is advantageously exploited. In practice, the characteristics of each transmission and reception head of the devices of the network as well as of the transmission channel change only very slowly and the registering of a new device in the network is a relatively rare event. This learning—the knowledge of a newcomer—can therefore afford to be relatively slow.

To allow synchronization, matters are contrived in such a way that the allocation of the windows of a frame is known to all the devices of the network at the start of each frame. Thus, a member can make use of his a priori knowledge of the transmission source by preparing the synchronization characteristics by interrogating tables updated during previous listening-ins. For example, right at the start of the reception window it sets the amplification gain of its reception chain to the value which it used earlier with success during the window which this same source previously occupied. It will profit therefrom in order to reupdate this value for the future by differencing.

Each device of the network must warn every other device of its intention to use the passband, that is to say of the number of windows per frame which it wishes to use in the future. Only the devices communicating directly with the device transmitting this information are warned thereof directly. In order for this information to be known by all, according to the present exemplary embodiment it is repeated in the control windows transmitted by these directly reached devices and it thus travels gradually to all the devices of the network.

The process in accordance with the invention therefore comprises the step of gradually propagating the transmission channel-sharing information among its various constitute devices.

The rate of propagation of this information depends on the relative position of the control windows with respect to one another. If they are for example disposed in the frame following the order of the numbers of the devices (see FIG. 3 described hereinbelow), the information item emanating from device 1 will be transmitted instantaneously to the devices contactable via the wireless connection which will be able to repeat it during their control window in the course of the same frame.

FIG. 3 is an example of the allocating of the windows of a frame to the five devices of FIG. 1 where the control windows are distributed in the frame in the order of their numbering. The other windows of the segment which are reserved for the useful data are distributed in the remaining space.

On the other hand, an information item emanating from a control window of the last device transmitting in the course of the frame will not be able to be transmitted to the other devices until the next frame at the very earliest. This is for example the case for the device 5 in the case of the frame of FIG. 3.

In a network having incomplete connectivity, it is possible to allocate a depth to each device of the network. The depth of a device is defined as being the number of frames required in order for an information item emanating from this device to be broadcast throughout the network.

In the example of the network of FIG. 1, if transmitter number 5 wishes to announce its intention to modify the number of windows occupied, it will have to wait 2 frames after the current frame before being certain that all the members of the network will be warned thereof. Hence, it is only onwards of the third frame following the current frame that it will actually be able to implement the new allocation. It will thus be necessary to recalculate the depth of all the members of the network each time a device is connected to the network or disconnected from the network.

The drawbacks of this mechanism for broadcasting information regarding the sharing of the frame by gradual repetition are on the one hand an increase in the volume of control data in the frame and on the other hand the non-negligible time of a change of frame configuration.

So as not to hugely inflate the volume of information to be repeated which describes which device is using which window of the frame, the format of this devices successively occupying each window in the frame for each of the windows. According to the present example, the number of windows occupied by each device is transmitted, coded according to a convention common to the devices and a parameter which characterizes the device which made the request. The convention for coding this list then enables each device to determine the frame configuration unambiguously.

Let us assume for example that the frame contains 100 data windows and that devices 1, 2, 3, 4, 5 occupy respectively 10, 50, 10, 2 and 5 windows. It is for example possible to decide to place the groups of windows in order of the numbers of the devices (each device of the wireless network having a specific number) i.e. in this instance the 10 windows of member 1, then the 50 of 2, then the 10 of 3, then the 2 of 4 and finally the 5 of 5. The repeating of the information in each control window then relates only to a field of 5 times 7 bits, each group of 7 bits giving the number of windows which relates to a given device. This convention is given merely by way of example, other conventions could also be used.

FIG. 4 illustrates an example of the propagation according to the invention of the information relating to the allocating of the windows to each device in the network of FIG. 1, a frame being structured in the manner illustrated by FIG. 3. Device 4 determines a new allocation of the windows. This new allocation is broadcast in the control window allocated to device 4 in frame i, which is the first frame of FIG. 4. Given that this control window is transmitted to device 5, this is the first device which will be able to broadcast the devices with which it is linked. The control window of device 4 during frame i is also received by devices 1 and 2, but these will not be able to propagate it until frame i+1. Device 3 will be warned subsequent to the transmission of the control window of frame i+1, and will be able to transmit the information in the course of this frame i+1.

The asynchronous and isochronous data can be transmitted in reservation mode as described earlier. There is a subtle distinction between reservation for the transmission of isochronous and asynchronous data: in the case of asynchronous data, the reservation is renegotiated at each frame, whereas in the case of isochronous data, the reservation can only be negotiated when opening an isochronous connection. In the case of asynchronous data, when transferring considerable volumes of data, it is preferable to use a reservation mode. On the other hand, in the case of low data volumes, it may be beneficial to use a contention mode. It is therefore beneficial to provide two asynchronous modes of transmission, one mode with reservation (imposing a latency time, but more effective for considerable volumes of data) and a contention mode (effective for small data volumes, since the latency is reduced as is the probability of collision). In this case the frame can be split up into an area reserved on the one hand for the isochronous links (and asynchronous with reservation), and on the other hand into an area available for the asynchronous links in contention mode. It is moreover conceivable that an asynchronous device may not have to wait for the broadcasting of the number of packets which it expects to transmit incessantly, but that it may attempt transmission as soon as possible in the part of the frame reserved for asynchronous transfer in contention mode. The destination device is necessarily warned thereof immediately since it is in direct radio contact with the transmitter device. Cases of collision are managed by collision detection by the receiver device in the form of acknowledgement of receipt or of non-receipt and possible repetition after a random number of frames, a conventional process known by the name "Aloha". In order to decrease the occurrence of these collisions, it may be advisable to use the so-called "slotted Aloha" version in which the possible commencements of asynchronous transmissions are regularly spaced. In all cases, it is necessary for the reception function of the devices of the network to know how to estimate the quality of a packet received, a likely presumption provided that blockwise error decoding is implemented.

What is claimed is:

1. Method of transmission in a transmission network comprising transmission devices linked by a wireless network part of said transmission network comprising the steps of:

performing the wireless communications according to an isochronous protocol, in which a wireless transmission frame comprises time windows allocated on reservation to transmission devices, and performing the allocating of a window of a frame to a transmission device as a function of the number of windows reserved per frame by each transmission device and of at least one other parameter identifying each transmission device.

2. Method according to claim 1, wherein each frame comprises one control window per transmission device linked to the wireless part of the network, the order of the control windows in each frame being known to the other transmission devices of this wireless part of the network.

3. Method according to claim 2, wherein the position of each control window within a frame is determined subsequent to a reinitialization of the network.

4. Method according to claim 3, wherein, when registering a transmission device in the wireless network, an order number is allocated to it, the order of the control windows being deduced from the order of the numbers allocated to the transmission devices of the wireless network.

5. Method according to claim 2 wherein a control window of a transmission device comprises a windows reservation data packet.

6. Method according to claim 5, wherein a given transmission device receiving a reservation request by another transmission device includes the reservation request in a next control window associated with the given transmission device.

7. Method according to claim 2 wherein, in response to a change of topology of the wireless network, each respective transmission device transmits a signaling in a control window of the respective transmission device, the signaling intended to be broadcast in the wireless network and to be returned by each of the other devices, the respective transmission device which sent the signaling determining on the basis of the returns of signaling by the other transmission devices the duration of broadcasting of the respective transmission device's request for reservation in the wireless network.

8. Method according to claim 7, wherein a transmission device having sent a windows reservation request implements the reservation only after a duration corresponding to the duration of broadcasting of its control data in the network.

9. Method according to claim 1 wherein a frame furthermore comprises a time interval whose use is governed by a contentious process reserved for asynchronous transmission.

10. Method for transmitting data by a first transmission device in a wireless network, comprising the steps of:

obtaining a number of time windows reserved by each transmission device in the network and an identifier of each transmission device;

determining time windows allocated within a transmission frame to said first transmission device as a function of the number of windows reserved by said transmission device and said identifiers.

* * * * *